(12) United States Patent
Pinera et al.

(10) Patent No.: US 10,634,153 B1
(45) Date of Patent: Apr. 28, 2020

(54) APPARATUS AND PROCESS FOR MANUFACTURING A CENTRIFUGAL PUMP WITH A ROTOR WITHIN A SINGLE PIECE HOUSING

(71) Applicants: Alex Pinera, Jupiter, FL (US); Stephen M Brooks, Jupiter, FL (US); Timothy J Miller, Jupiter, FL (US)

(72) Inventors: Alex Pinera, Jupiter, FL (US); Stephen M Brooks, Jupiter, FL (US); Timothy J Miller, Jupiter, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 790 days.

(21) Appl. No.: 15/173,773

(22) Filed: Jun. 6, 2016

Related U.S. Application Data

(60) Provisional application No. 62/192,433, filed on Jul. 14, 2015.

(51) Int. Cl.
*F04D 29/043* (2006.01)
*F04D 29/046* (2006.01)
*B33Y 10/00* (2015.01)
*B33Y 80/00* (2015.01)
*F04D 17/08* (2006.01)
*F04D 25/04* (2006.01)
*F02K 9/46* (2006.01)

(52) U.S. Cl.
CPC ............ *F04D 29/043* (2013.01); *B33Y 10/00* (2014.12); *B33Y 80/00* (2014.12); *F04D 29/046* (2013.01); *F02K 9/46* (2013.01); *F04D 17/08* (2013.01); *F04D 25/04* (2013.01); *F05D 2230/31* (2013.01)

(58) Field of Classification Search
CPC ... F02K 9/46; F02K 9/48; F04D 13/04; F04D 13/043; F04D 17/08; F04D 25/04; F04D 25/045
See application file for complete search history.

(56) References Cited

U.S. PATENT DOCUMENTS

| | | | | |
|---|---|---|---|---|
| 2,398,790 A * | 4/1946 | Holman | ................ | B24B 13/02 451/163 |
| 3,817,653 A * | 6/1974 | Onal | ................ | F04D 13/14 415/143 |
| 3,935,833 A * | 2/1976 | Onal | ................ | B63H 11/08 440/47 |
| 3,953,150 A * | 4/1976 | Onal | ................ | F04D 1/006 416/184 |

(Continued)

OTHER PUBLICATIONS

Rachuk, et. al, "Single Shaft Turbopump Expands Capabilities of Upper Stage Liquid Propulsion", AIAA-2008-4946, 44th AIAA/ASME/SAE/ASEE Joint Propulsion Conference & Exhibit, Hartford, Connecticut, Jul. 21-23, 2008, pp. 1-15. (Year: 2008).*

(Continued)

*Primary Examiner* — Lorne E Meade
(74) *Attorney, Agent, or Firm* — Koenig IP Works, PLLC

(57) ABSTRACT

A turbopump is formed from a metal additive manufacturing process in which both the housing and the impeller are formed as a single piece with the impeller trapped within the single piece housing. The impeller is formed with an axial bore and a shaft is secured by a tie bolt on one end to secure forward and aft bearings within the housing after the impeller and housing have been formed.

8 Claims, 2 Drawing Sheets

(56) References Cited

U.S. PATENT DOCUMENTS

| | | | | |
|---|---|---|---|---|
| 4,057,371 A | * | 11/1977 | Pilarczyk | F01D 25/166 417/409 |
| 4,131,386 A | * | 12/1978 | Mabe, Jr. | F04D 1/006 415/172.1 |
| 4,209,282 A | * | 6/1980 | Eberhardt | F01D 11/003 169/24 |
| 4,697,987 A | * | 10/1987 | Katayama | F04D 29/624 416/198 A |
| 4,714,405 A | * | 12/1987 | Schaefer | F02C 7/236 415/143 |
| 7,281,901 B2 | * | 10/2007 | Garman | B22F 3/105 416/233 |
| 7,775,763 B1 | * | 8/2010 | Johnson | F04D 29/167 415/111 |
| 9,174,426 B1 | * | 11/2015 | Dowd | B23P 15/006 |
| 9,903,207 B2 | * | 2/2018 | Tozzi | F04D 29/023 |
| 2017/0120535 A1 | * | 5/2017 | MacCurdy | B33Y 10/00 |

OTHER PUBLICATIONS

Barry Berman, "3-D printing: The new industrial revolution", Business Horizons, vol. 55, 2012, pp. 155-162. (Year: 2012).*

Alwi et al., "Contrucktion MegaScale 3D Printing—Group 1", Faculty of Engineering and Physical Sciences, University of Surrey, United Kingdom, Jan. 11, 2013, pp. 1-201. (Year: 2013).*

Scott Gruenwald, "3D Print a Parametric Peristaltic Pump in One Piece", Sep. 22, 2014 [https://3dprintingindustry.com/news/3d-print-parametric-peristaltic-pump-one-piece-33328/ accessed on May 3, 2019] (Year: 2014).*

A. M. Abdul-Rani et al., "Overcoming Limitations in DFM Using Layer Manufacturing", Applied Mechanics and Materials, vol. 660, 2014, pp. 94-98. (Year: 2014).*

MacCurdy et al., "Printable Hydraulics: A Method for Fabricating Robots by 3D Co-Printing Solids and Liquids", 2016 IEEE International Conference on Robotics and Automation (ICRA), Stockholm, Sweden, May 16-21, 2016, pp. 3878-3885. (Year: 2016).*

* cited by examiner

US 10,634,153 B1

APPARATUS AND PROCESS FOR MANUFACTURING A CENTRIFUGAL PUMP WITH A ROTOR WITHIN A SINGLE PIECE HOUSING

CROSS-REFERENCE TO RELATED APPLICATIONS

This application claims the benefit to U.S. Provisional Application 62/192,433 filed on Jul. 14, 2015 and entitled APPARATUS AND PROCESS FOR MANUFACTURING A CENTRIFUGAL PUMP WITH A ROTOR WITHIN A SINGLE PIECE HOUSING.

GOVERNMENT LICENSE RIGHTS

This material is based upon work supported by the Defense Advanced Research Projects Agency (DARPA) and the Army Contracting Command—Aberdeen Proving Grounds (ACC-APG) under Contract/Purchase Order number W911NF-15-P-0063. The United States Government has certain rights in the invention. Distribution Statement A: Approved for public release, distrubution unlimited.

BACKGROUND OF THE INVENTION

Field of the Invention

The present invention relates generally to a centrifugal pump for a liquid rocket engine, and more specifically to a centrifugal pump manufactured with a single piece housing using a metal additive manufacturing process.

Description of the Related Art Including Information Disclosed Under 37 CFR 1.97 and 1.98

Prior art manufacturing methods used to produce liquid rocket engine components have historically led to high manufacturing costs. A current challenge in the rocket propulsion industry base is lack of modernization in manufacturing processes and inefficiencies in production. With the low qualities inherent in space propulsion hardware, and an ever increasing drive toward reduced cost, there is an increased interest in design for manufacturability. An optimal balance between commercial best practices and advanced manufacturing techniques could be implemented to meet the future requirements of the rocket propulsion industry. There is potential for significant advancement in cost reduction, design and manufacturing for turbopumps through the application of additive manufacturing (AM).

FIG. 1 shows a LOX pump 10 with an extremely efficient design. The LOX pump is formed from only eleven part numbers (not including fasteners) and is very compact. The pump is located in the center and is a back-to-back design similar to the SSME High Pressure Oxidizer Turbopump (HPOTP). This reduces/eliminates rotor axial thrust imbalance. There is an inducer in front of each impeller to improve cavitation performance and the impellers are shrouded to minimize secondary flow leakage without requiring extremely tight tolerance. The bearings 12 straddle the impellers 15 and are cooled by recirculating the inlet LOX with the natural pumping of the rotor. The bearings 12 are axially held on the rotor by identical spanner nuts 14. To minimize assembly time and components, the impellers 15 are integral with the shaft. To minimize cost, the two bearings 12 are the same, and the spanner nuts 14 are the same. To conserve weight and minimize seals, the inlets and discharge connections are integral 37 degree flared fittings. Finally, since the size is so small and the discharge pressure is low, the rotor design speed is low so the stresses on the parts will be extremely low.

The LOX pump in FIG. 1 includes a cover plate 13 held on by several bolts 31, a forward seal 16, and aft seal 17, a main housing 11, a threaded nut 18 to secure the forward and aft seals 16 and 17 to the housing 11, an aft housing 19, and a spring 22. Forward and aft labyrinth seals 28 are formed with the impeller 15 all as a single piece where the lab seals form a seal with stationary seal members 16 and 17 secured on the main housing 11.

The LOX pump in FIG. 1 is assembled axially. First, the impeller 15 is assembled from right to left into the main housing 11. Second, the aft housing 19 is assembled over the impeller 15, also from right to left, and is mechanically attached to the main housing 11 using bolts 31. Then, bearings 12 and other features such as spanner nuts 14, spring 22, and seal 21 are assembled from the ends of the turbopump. Finally, the cover plate 13 is attached and held on with several bolts 31.

BRIEF SUMMARY OF THE INVENTION

A turbopump such as a LOX turbopump for a liquid rocket engine is formed using a metal additive manufacturing process in which a single piece impeller is formed within a single piece housing in which the impeller is trapped within the single piece housing. The housing is formed with a fluid inlet and a fluid outlet. The impeller is formed with an axial bore in which a shaft is inserted after the impeller and housing have been formed. Forward and aft bearing support surfaces are machined on to the outer surfaces of the impeller and then two bearings are inserted into the housing and secured by a tie bolt fastened on one end of the shaft. A forward cover plate encloses a forward opening of the housing and a buffer seal encloses an aft opening of the housing.

The cover plate and the buffer seal form support surfaces for outer races of the two bearings. The single piece impeller is formed with forward and aft labyrinth seal teeth all as a single piece, and the housing is formed with seal surfaces for the labyrinth teeth that form forward and aft labyrinth seals between the impeller and housing.

DETAILED DESCRIPTION OF THE INVENTION

The present invention is LOX pump used in a liquid rocket engine in which the rotor is formed by a metal additive manufacturing process and formed within a single piece housing that is also formed by a metal additive manufacturing process.

Figure 1:
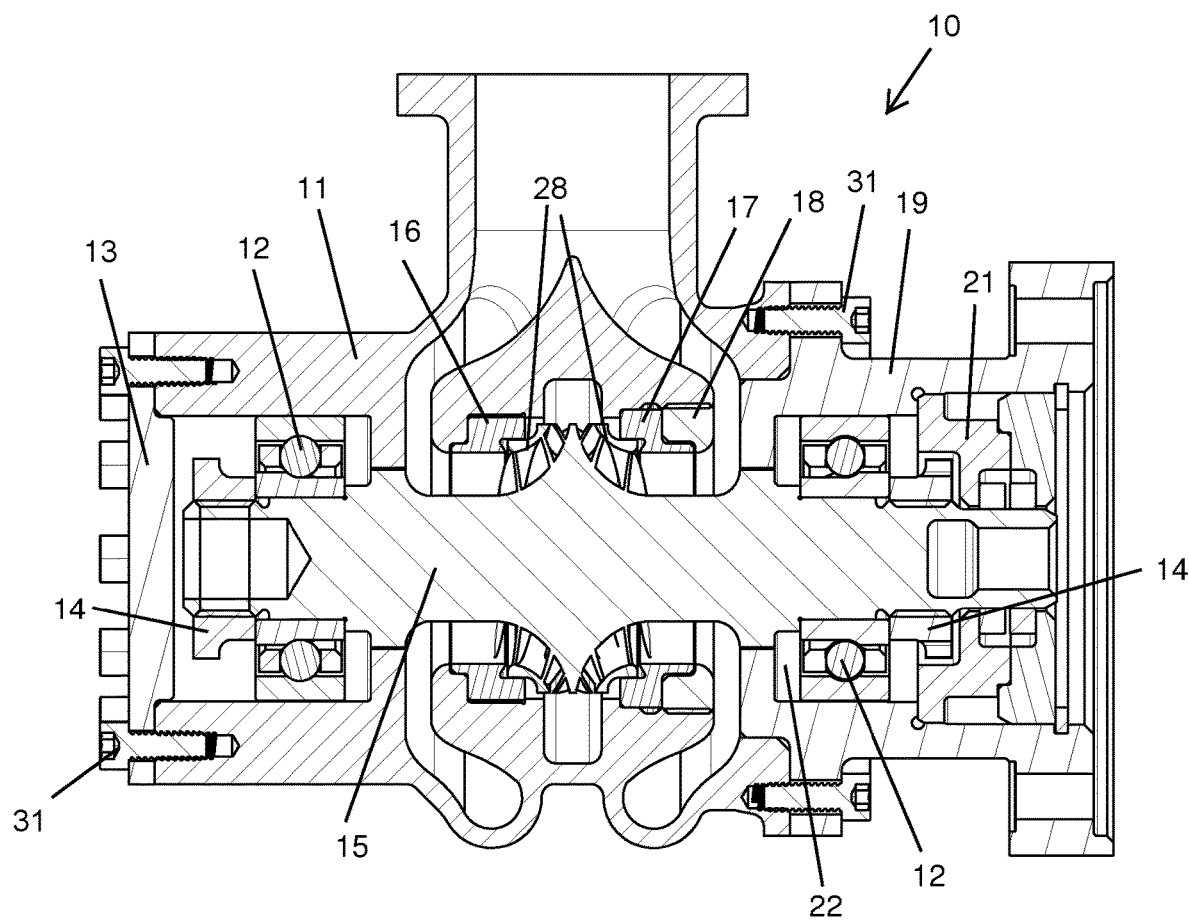
FIG. 1 shows a cross section view of a LOX pump of the prior art.
Figure 2:
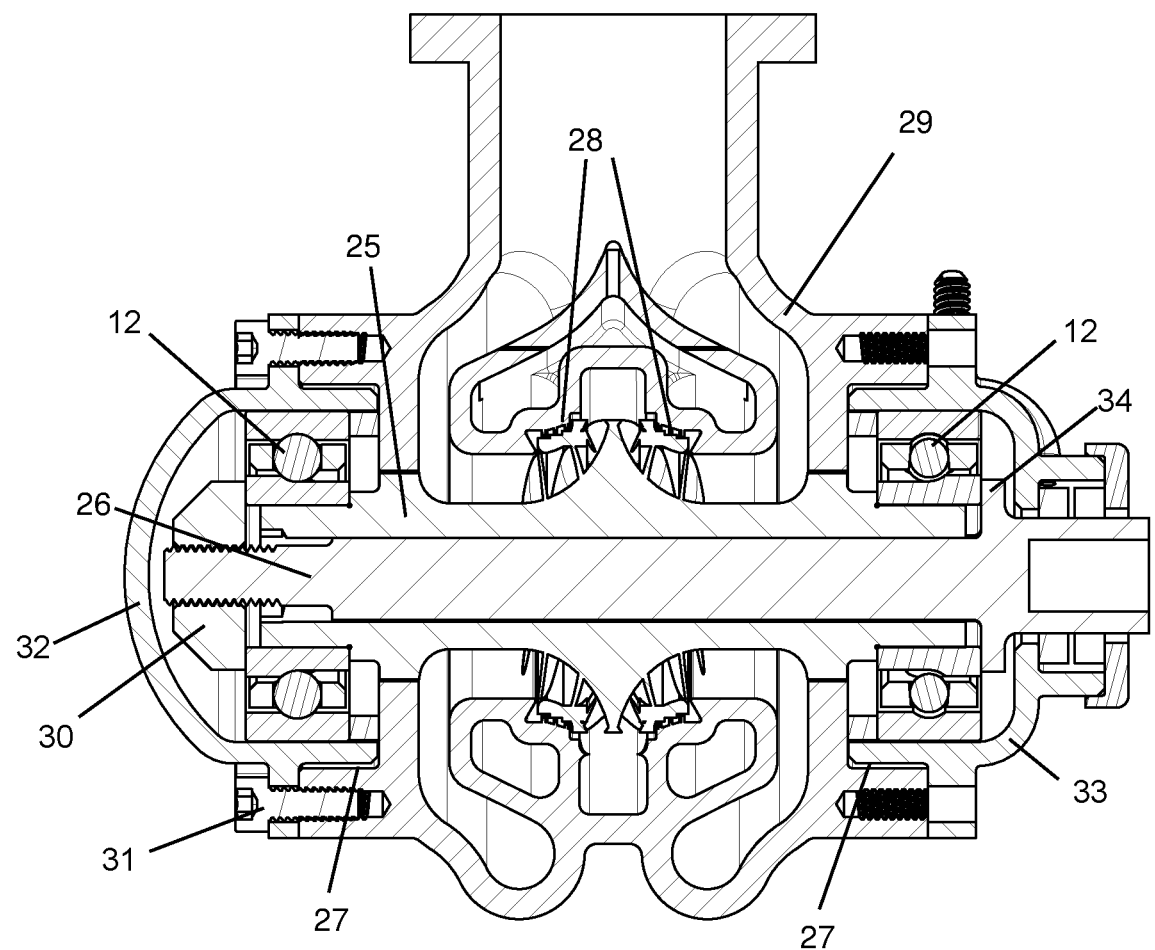
FIG. 2 shows a cross section view of a LOX pump of the present invention.

FIG. 2 shows an embodiment of the present invention of a LOX pump of the present invention that is formed by a metal additive manufacturing process in which a one-piece rotor is formed within a one-piece housing. The impeller 25 and the shaft 26 are simultaneously manufactured within the housing 29, the forward seal 16 and the aft seal 17 and the threaded nut 18 of the FIG. 1 embodiment is eliminated, the requirement to finish machining of the housing for the bearing OD (outer diameter) 27 of the FIG. 1 embodiment is eliminated, and the FIG. 2 embodiment provides for the elimination of all machining operations from the shaft. The FIG. 2 embodiment also eliminates the aft housing 19 and associated interface flange, eliminates the seal and finish machining, and eliminates the screws required in the FIG. 1 embodiment. The single piece impeller 25 is printed with an axial bore in which the shaft 26 passes through.

In the FIG. 2 design, a double suction impeller 25 is trapped within the housing 29 since the outer diameter of the impeller 25 is greater than a minimum opening on either end of the housing 29. This is achieved by printing the components simultaneously within the Selective Laser Melting (SLM) machine. Then, powder and support structure (if required) removal is performed. The bearings 12 are installed on the ends of the shaft 26. Conventional manufacturing is required for the bearings 12 due to high precision requirements needed. With the exception of the shaft tie-bolt 30 and the shaft seal, all other components are printed on an SLM machine.

A forward and an aft labyrinth seal 28 are formed on the impeller 25 all as a single piece and form seals with the surfaces of the single piece housing 29. The single piece housing 29 is formed with the impeller 25 and forward and aft labyrinth seals 28 inside the housing 29. Outer surfaces of the impeller 25 where the bearing inner races are placed are machined while the impeller 25 is inside the housing 29. The bearings 12 are then installed in place on the impeller 25, and then the shaft 26 is inserted within the impeller 25 and secured in place with the shaft tie bolt 30. A flange 34 is formed on the aft side of the shaft 26 and along with the shaft tie bolt 30 compresses the bearing inner races to flanges formed on the outer surface of the impeller 25. A forward cover plate 32 is installed with a number of bolts 31. A buffer seal 33 is installed on the aft end of the housing 29 and the aft bearing 12. A number of bolts 31 are used to secure the buffer seal 33 to the housing 29.

Rotor balancing is another critical area. Typically, an assembly balance of the rotor is performed for turbopump rotors. That is, the full rotor is assembled and balanced on a balance machine. Since the rotor 25 is printed inside the housing 29, this method cannot be used without special tooling. In the present invention, a method of trim balancing is used where the rotor 25 is spun up to various high speeds and accelerometers on the housing 29 along with a proximity probe looking at the rotor is used to determine the rotor imbalance. The imbalance is corrected by grinding locations on each end of the shaft 26.

By printing the pump impeller 25 within a one-piece housing 29, a dramatic reduction in part count, procurement activities, and assembly time is achieved over the prior art, which directly translates into a reduction in recurring cost and lead time. These reductions are estimated to reduce the cost of the LOX pump by approximately 40%. Similarly, if not more (due to the higher part count), reductions will likely result for a hydrogen pump. The turbomachinery for a typical rocket engine accounts for about one-third of the cost of the total engine. Thus, significant reductions in turbomachinery cost have large impacts on the overall cost of the engine.

We claim the following:

1. A turbopump comprising:
    a single piece housing with a fluid inlet, a fluid outlet, a forward opening, and an aft opening the single piece housing having an inner minimum diameter;
    a single piece impeller having a maximum outer diameter greater than the inner minimum diameter of the single piece housing, the single piece impeller including an axial bore;
    a shaft inserted within the axial bore of the single piece impeller;
    a forward bearing and an aft bearing to rotatably support the single piece impeller within the single piece housing; and
    a shaft tie bolt threaded on one end of the shaft to secure the forward bearing and the aft bearing between the single piece housing and the single piece impeller.

2. The turbopump of claim 1, and further comprising wherein:
    the single piece housing and the single piece impeller are formed from a metal additive manufacturing process.

3. The turbopump of claim 1, wherein:
    the single piece impeller is formed with a forward labyrinth seal and an aft labyrinth seal all as a single piece.

4. A turbopump comprising:
    a single piece housing with a fluid inlet, a fluid outlet, a forward opening, and an aft opening, the single piece housing having an inner minimum diameter;
    a single piece impeller having a maximum outer diameter greater than the inner minimum diameter of the single piece housing;
    a forward bearing and an aft bearing; to rotatably support the single piece impeller within the single piece housing;
    a forward cover plate enclosing a forward opening of the single piece housing, the forward cover plate forming a support surface for the forward bearing; and
    an aft buffer seal enclosing an aft opening of the single piece housing the aft buffer seal forming a support surface for the aft bearing.

5. A method of forming a turbopump with a single piece impeller formed within a single piece housing comprising the steps of:
    forming the single piece housing with a fluid inlet and a fluid outlet using a metal additive manufacturing process;
    forming the single piece impeller with an axial bore and using the metal additive manufacturing process within the single piece housing at the same time that the single piece housing is being formed;
    machining a forward bearing support surface on a forward side of the single piece impeller and an aft bearing support surface on an aft side of the single piece impeller after the single piece impeller has been formed within the single piece housing;
    inserting a forward bearing and an aft bearing into the single piece housing; and
    securing the forward bearing and the aft bearing between the single piece housing and the single piece impeller with a tie bolt fastened on one end of a shaft passing through the axial bore of the single piece impeller.

6. The method of forming a turbopump of claim 5, and further comprising the step of:
    forming a forward labyrinth seal and an aft labyrinth seal on the single piece impeller all as a single piece.

7. The method of forming a turbopump of claim 5, and further comprising the step of:

forming the single piece impeller with a maximum outer diameter greater than a minimum inner diameter of the single piece housing such that the single piece impeller is trapped within the single piece housing.

8. The method of forming a turbopump of claim 5, and further comprising the steps of:

enclosing a forward opening of the single piece housing with forward cover plate; and enclosing an aft opening of the single piece housing with a buffer seal.

\* \* \* \* \*